(12) United States Patent
Bian et al.

(10) Patent No.: US 11,360,013 B2
(45) Date of Patent: Jun. 14, 2022

(54) DOUBLE-CAPILLARY VISCOMETER FOR MEASURING VISCOSITY OF ACID NATURAL GAS

(71) Applicant: Southwest Petroleum University, Sichuan (CN)

(72) Inventors: Xiaoqiang Bian, Sichuan (CN); Muming Wang, Sichuan (CN); Yongbing Liu, Sichuan (CN)

(73) Assignee: Southwest Petroleum University, Chengdu (CN)

( * ) Notice: Subject to any disclaimer, the term of this patent is extended or adjusted under 35 U.S.C. 154(b) by 712 days.

(21) Appl. No.: 16/388,815

(22) Filed: Apr. 18, 2019

(65) Prior Publication Data

US 2020/0110016 A1 Apr. 9, 2020

(30) Foreign Application Priority Data

Oct. 8, 2018 (CN) .......................... 201811165857.3

(51) Int. Cl.
*G01N 11/08* (2006.01)
(52) U.S. Cl.
CPC .................................... *G01N 11/08* (2013.01)
(58) Field of Classification Search
CPC ................................ G01N 11/08; G01N 11/04
See application file for complete search history.

(56) References Cited

U.S. PATENT DOCUMENTS

| | | | |
|---|---|---|---|
| 5,637,790 A * | 6/1997 | de Corral | G01N 11/08 73/54.04 |
| 5,833,926 A * | 11/1998 | Wurzel | B01J 4/02 422/504 |
| 2006/0065044 A1* | 3/2006 | Tsang | G01N 11/06 73/54.07 |

FOREIGN PATENT DOCUMENTS

| | | | |
|---|---|---|---|
| CN | 103336026 A | * | 10/2013 |
| CN | 104502231 A | * | 4/2015 |
| CN | 104502231 B | * | 4/2017 |

* cited by examiner

*Primary Examiner* — Francis C Gray

(57) ABSTRACT

The present disclosure provides a device and method for measuring viscosity of acid natural gas with high precision and a wide temperature range. The device is based on the theoretical basis of gas measurement of double-capillary method. Ground conditions (low temperature and low pressure) or formation conditions (high temperature and high pressure) can be simulated by presetting different temperatures and pressures. The viscosity change of acid gas with changes in temperature and pressure is measured. The device has fewer measuring steps, is easy to operate and has high precision, and can provide valid reference data for actual projects or experiments.

9 Claims, 1 Drawing Sheet

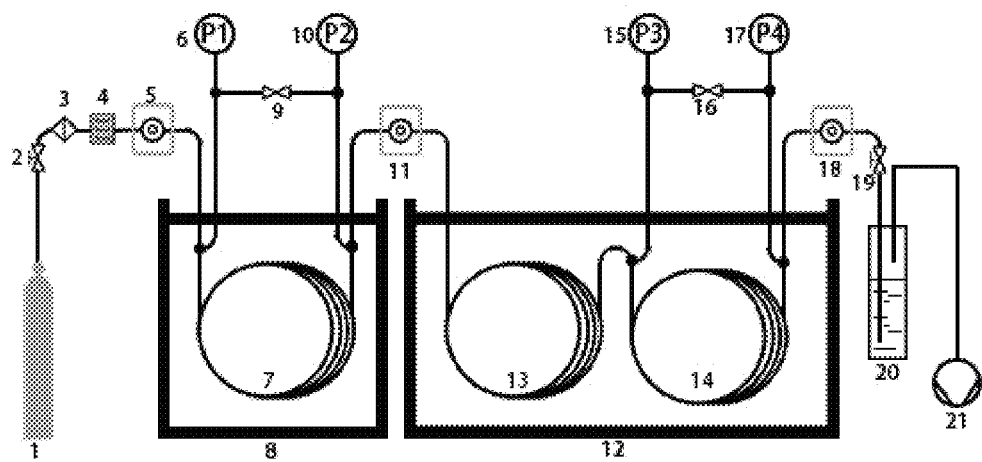

US 11,360,013 B2

DOUBLE-CAPILLARY VISCOMETER FOR MEASURING VISCOSITY OF ACID NATURAL GAS

CROSS-REFERENCE TO RELATED APPLICATIONS

This application claims the benefit of priority from Chinese Patent Application No. CN201811165857.3, filed on Oct. 8, 2018. The content of the aforementioned application, including any intervening amendments thereto, is incorporated herein by reference in its entirety.

TECHNICAL FIELD

The present disclosure relates to a double-capillary viscometer for measuring acid gas viscosity and a measuring method thereof.

BACKGROUND

Viscosity of natural gas is an important factor in natural gas development projects. Using molecular thermodynamic calculation methods, viscosity of natural gas of known components can be calculated with high precision. However, in actual engineering, the natural gas produced is not only unknown in composition, but also contains corrosive gases such as $H_2S$, causing corrosion of pipelines and damage to equipments and facilities. According to operation principles, viscometers for natural gas can be roughly classified into a falling body viscometer, a vibrating body viscometer, a vibrating string viscometer and a capillary viscometer.

The falling body viscometer obtains the viscosity of fluid by measuring the falling (free falling) movement duration of an object in the liquid. The falling body is generally a sphere or a cylinder. According to different types of falling bodies, the falling body viscometer can be divided into falling ball viscometer, falling tube viscometer, gas cylinder viscometer, falling needle viscometer, rolling ball viscometer. The main disadvantage is that the measurement accuracy depends on high-precision density data and is not suitable for measurement of low-viscosity fluids. In addition, the falling body viscometer cannot measure the density of the liquid and the structure is complicated, and it is difficult to achieve automated measurement.

The vibrating body viscometer obtains the viscosity of fluid by measuring the attenuation of torsional oscillation of an axisymmetric object suspended from a filament. When the oscillating body makes a torsional movement, the fluid exerts a certain resistance to the movement, so that the torsional movement is gradually attenuated. According to different types of vibrating body, the vibrating body viscometer can be classified into oscillating disc viscometer and oscillating piston viscometer. The main advantage is that viscosity can be obtained without knowing the density. The vibrating body viscometer is suitable for measurements of low-viscosity fluids and small amounts of fluid samples.

The vibrating string viscometer was first proposed by Tough et al. in 1963. The basic principle of this method is causing a infinitely long wire having a circular cross section to make a transverse movement perpendicular to the axial direction in a viscous fluid, and viscosity can be measured according to a damping effect of the fluid on the vibration.

The capillary viscometer is designed based on the Hagen-poiseuille law. The main feature of a capillary viscometer is a long tube of small diameter. The viscosity of fluid flowing within the tube can be calculated by measuring the volumetric flow rate and pressure drop through the capillary.

In the year of 2000, John J. Hurly improved the calculation method based on the predecessors. The atomic potential energy of helium gas is calculated by ab initio calculation, and the thermophysical properties of helium gas, the second virial coefficient and the viscosity of pure helium gas are derived. The uncertainty of the calculation is far less than that of experimental measurement.

In the year of 2005, Berg first proposed a calculation model for a quartz capillary flowmeter. In the following year, he corrected the results of the experiment and found that the capillary flowmeter had less uncertainty in measuring viscosity after six items of gas corrections.

In the year of 2006, May designed a double-capillary viscometer based on Berg's theory. The viscometer is based on a new quantum calculation method for helium gas properties. Based on the physical property parameters obtained by the helium gas quantum theory simulation, the physical properties of argon gas are relatively measured. May found through experiments that the calculated value of ab initio calculation is in good agreement with the actual measured value of the experiment and has very similar uncertainty. Due to the advantages of the double-capillary method design principle, many potential instability factors are eliminated in the calculation.

With the continuous development of molecular thermodynamics, the viscosity of single-molecule gas (such as helium gas) can be calculated with higher precision, and the derived double-capillary viscometer measuring method has desired accuracy.

SUMMARY

The present disclosure aims to provide a double-capillary viscometer and method for measuring acid gas where the temperature and pressure can be set differently. The device has the advantages of less measuring steps, is easy to operate and has high precision, and can provide valid reference data for practical engineering and experimental analysis.

In order to achieve the above object of the present disclosure, the solution adopted by the present disclosure is: A double-capillary viscometer for measuring viscosity of acid natural gas, including: an inlet shutoff valve (2) connected to a gas cylinder (1), a measuring line connected to the inlet shutoff valve (2), a solid particle filter (3) and a gas dryer (4), an upstream inlet piezoelectric valve (5) connected in sequence an upstream capillary (7), a intermediate piezoelectric valve (11), a downstream preheating capillary (13), a downstream measuring capillary (14), a downstream outlet piezoelectric valve (18), an outlet shutoff valve (19), a $H_2S$ absorption bottle (20), and a vacuum pump (21) connected in a main measuring line; the main measuring line being divided into an upstream line and a downstream line; wherein the upstream capillary tube (7) is spirally wound on a cylindrical aluminum block and immersed in an alcohol thermostat (8), and the downstream preheating capillary (13) and the downstream measuring capillary (14) are immersed in an oil bath heating device (12) in a same manner; the upstream inlet pressure gauge (6) is connected behind the upstream inlet piezoelectric valve (5), and an upstream outlet pressure gauge (10) is arranged before the intermediate pressure piezoelectric valve (11), the upstream inlet pressure gauge (6) and the upstream outlet pressure gauge (10) being connected by an upstream differential pressure gauge (9); a downstream inlet pressure gauge (15) is arranged between the downstream preheating capillary (13)

and the downstream measuring capillary (14), and a downstream outlet pressure gauge (17) is arranged before the downstream outlet piezoelectric valve (18), the downstream inlet pressure gauge (15) and the downstream outlet pressure gauge (17) being connected by an downstream differential pressure gauge (16).

Preferably, the upstream capillary (7), the downstream preheating capillary (13) and the downstream measuring capillary (14) are of a same dimension.

Preferably, the upstream capillary (7), the downstream preheating capillary (13) and the downstream measuring capillary (14) are respectively spirally wound on a cylindrical aluminum block with a radius of 0.1 mm Preferably, the upstream capillary (7), the downstream preheating capillary (13) and the downstream measuring capillary (14) are all made of Hastelloy, with a uniform nominal inner diameter of 0.500 mm.

Preferably, the gas cylinder (1) is capable of providing a sufficient and stable gas output Preferably, the oil bath heating device (12) provides a temperature in a range of 298.15-513.15K through silicone oil bath heating method.

The double-capillary viscometer for measuring viscosity of acid natural gas, wherein the viscometer is measured by steps of:

Step 1: flushing the line with standard helium gas for 30 minutes;

Step 2: keeping the alcohol thermostat and the oil bath thermostat at 298.15K, introducing a helium gas when temperature is stable, obtaining $(P_1^{He}, P_2^{He})_{0,298.15}^{He}$ when flow is stable, keeping the temperature constant and pumping the line to vacuum, introducing a gas to be measured, controlling an inlet pressure by the upstream inlet piezoelectric valve to be constant (for example, 140 kPa), obtaining $(P_1^{mea}, P_2^{mea})_{0,298.15}^{mea}$ when flow is stable, and calculating a viscosity ratio of the helium gas to the measured gas at 298.15 K by a following formula, $$\frac{\eta_{0,298.15}^{mea}}{\eta_{0,298.15}^{He}} = \frac{(P_1^{mea} - P_2^{mea})_{0,298.15}^{mea}}{(P_1^{He} - P_2^{He})_{0,298.15}^{He}} \quad (1)$$

in the formula (1): He represents the helium gas;
Mea represents the gas to be measured;
η represents dynamic viscosity, mPa·s;
P represents pressure, MPa;

Step 3: warming the oil bath thermostat to temperature T at which the measurement is to be performed, introducing the gas to be measured when temperature is stable, controlling an inlet pressure by the upstream inlet piezoelectric valve to be constant (for example, 140 kPa), adjusting the outlet piezoelectric valve, controlling a pressure difference between P3 and P4 to be an experimental pressure difference, obtaining $(P_1, P_2, P_3, P_4)_{0,T}^{mea}$ when flow is stable, pumping the line to vacuum, introducing the helium gas, repeating above operations, obtaining $(P_1, P_2, P_3, P_4)_{0,T}^{He}$ when flow is stable, calculating a viscosity rate $R_{T,298.15}^{mea,He}$ based on obtained data by a following formula;

$$R_{T,298.15}^{mea,He} = \frac{(P_1^2 - P_2^2)^{He}}{(P_1^2 - P_2^2)^{mea}} \frac{(P_3^2 - P_4^2)^{mea}}{(P_3^2 - P_4^2)^{He}} \quad (2)$$

Step 4: calculating a theoretical value of the viscosity of helium gas at temperature T by formula (3):

$$\eta_{0,T}^{He} = -8.7272 \times 10^{-11} T^4 + 1.38504 \times 10^{-7} T^3 - 9.80906 \times 10^{-5} T^2 + 7.622 \times 10^{-2} T + 2.84835 \quad (3)$$

In the formula (3): T represents the temperature at which the measurement is to be performed, K;

Step 5: calculating a dynamic viscosity of the measured gas at a simulated temperature and pressure by formula (4):

$$\eta_{0,T}^{mea} = \eta_{0,T}^{He} \left( \frac{\eta_{0,298.15}^{mea}}{\eta_{0,298.15}^{He}} \right) R_{T,298.15}^{mea,He} \quad (4)$$

Compared with the prior art, the present disclosure has the following advantages:

1. The lines, three-way connections and the valves are all made of Hastelloy and have excellent corrosion resistance 2. The double-capillary viscometer is firstly applied for measuring viscosity of acid natural gas.

3. The measuring method of the present disclosure is simple, has good reproducibility. Viscosity can be obtained by electronic signal, and reference data can be dynamically provided for engineering projects.

4. The experimental precision is high, and the temperature and pressure range can be changed widely, which can meet the analog measurement of viscosity of natural gas under most conditions. The influencing mechanism of the acidic components of natural gas as well as the changes in temperature and pressure on the viscosity are studied.

BRIEF DESCRIPTION OF THE DRAWINGS

FIG. 1 is a schematic view of the structure of the present disclosure.

DETAILED DESCRIPTION OF EMBODIMENTS

As shown in the accompanying drawings, the present disclosure provides a double-capillary viscometer for measuring viscosity of acid natural gas, including: an inlet shutoff valve (2) connected to a gas cylinder (1), a measuring line connected to the inlet shutoff valve (2), a solid particle filter (3) and a gas dryer (4), an upstream inlet piezoelectric valve (5) connected in sequence an upstream capillary (7), a intermediate piezoelectric valve (11), a downstream preheating capillary (13), a downstream measuring capillary (14), a downstream outlet piezoelectric valve (18), an outlet shutoff valve (19), a $H_2S$ absorption bottle (20), and a vacuum pump (21) connected in a main measuring line; the main measuring line being divided into an upstream line and a downstream line; wherein the upstream capillary tube (7) is spirally wound on a cylindrical aluminum block and immersed in an alcohol thermostat (8), and the downstream preheating capillary (13) and the downstream measuring capillary (14) are immersed in an oil bath heating device (12) in a same manner; the upstream inlet pressure gauge (6) is connected behind the upstream inlet piezoelectric valve (5), and an upstream outlet pressure gauge (10) is arranged before the intermediate pressure piezoelectric valve (11), the upstream inlet pressure gauge (6) and the upstream outlet pressure gauge (10) being connected by an upstream differential pressure gauge (9); a downstream inlet pressure gauge (15) is arranged between the downstream preheating capillary (13) and the downstream measuring capillary (14), and a downstream outlet pressure gauge (17) is arranged before the downstream outlet piezoelectric valve (18), the downstream inlet pressure gauge (15) and the downstream outlet pressure gauge (17) being connected by an downstream differential pressure gauge (16).

The upstream capillary (7), the downstream preheating capillary (13) and the downstream measuring capillary (14) are of a same dimension.

The upstream capillary (7), the downstream preheating capillary (13) and the downstream measuring capillary (14) are respectively spirally wound on a cylindrical aluminum block with a radius of 0.1 mm.

The upstream capillary (7), the downstream preheating capillary (13) and the downstream measuring capillary (14) are all made of Hastelloy, with a uniform nominal inner diameter of 0.500 mm.

As a preferred embodiment of the present disclosure, the cylindrical aluminum block has a large specific heat capacity, and a high system thermal inertia, thus making the temperature field of the capillary more stable.

As a preferred embodiment of the present disclosure, the gas cylinder (1) is capable of providing a sufficient and stable gas output.

As a preferred embodiment of the present disclosure, the oil bath heating device (12) provides a temperature in a range of 298.15-513.15K through silicone oil bath heating method.

As a preferred embodiment of the present disclosure, the upstream capillary (7) and the downstream measuring capillary (14) are wound on the cylindrical aluminum block by a same winding method, which can offset the errors caused by deviation of the actual gas from the ideal state, gaseous slip, change in the kinetic energy at the inlet, and the centrifugal force.

As a preferred embodiment of the present disclosure, the downstream preheating capillary (13) is wound on a cylindrical aluminum block in a same manner as the upstream capillary (7) and the downstream measuring capillary (14), thereby reducing errors caused by gas expansion and radial temperature field change.

As a preferred embodiment of the present disclosure, the lines, the valves and the three-way connections are all made of Hastelloy and have excellent corrosion resistance.

As a preferred embodiment of the present disclosure, the pressure gauges (6) (10) (15) (17) use Y-100BFZ stainless steel anti-vibration pressure gauge produced by Shanghai Automation Instrument Factory Four, with a scale range of 0 to 2.4 MPa; the differential pressure gauges (9) (16) use CYP-150B stainless steel differential pressure gauge produced by Shanghai Automation Instrument Factory Four, with a differential pressure measurement range of 0 to 60 KPa and good corrosion resistance by which the vibration generated by rapid flow of gas can be effectively resisted.

The working principle of the present disclosure is as follows:

The gas to be measured flows from the gas cylinder (1) through the inlet shutoff valve (2), the solid particulate filter (3), the gas dryer (4), to the upstream inlet piezoelectric valve (5) into the upstream capillary (7). Through combined regulation of the sliding piezoelectric valve (5) and the intermediate piezoelectric valve (11), the molar flow rate of the gas (corresponding to the difference between the upstream inlet pressure gauge (6) and the upstream outlet pressure gauge (10) is controlled. At a set molar flow rate, the gas enters the downstream preheating capillary (13), the downstream measuring capillary (14), and the downstream outlet piezoelectric valve (18). Through regulation of the downstream outlet piezoelectric valve (18), the volumetric flow rate of the gas (corresponding to the value of the downstream outlet pressure gauge (17) is controlled. The difference between the downstream inlet pressure gauge (15) and the downstream outlet pressure gauge (17) is the simulated pressure, and the temperature set by the silicone oil thermostat (12) is the simulated temperature. The gas to be measured enters the downstream outlet piezoelectric valve (18), the outlet shutoff valve (19), the H$_2$S absorption bottle (20), and is finally safely recovered by the vacuum pump (21). The helium gas is subjected to the same operations to obtain the corresponding pressure data. The viscosity ratio $$\frac{\eta_{0,298.15}^{mea}}{\eta_{0,298.15}^{He}}$$

and rate $R_{T,298.15}^{mea,He}$ of helium gas to the gas to be measured at 298.15K are obtained by calculation using the formulas (1) and (2), the viscosity value $\eta_{0,T}^{He}$ of helium gas is obtained by calculation using formula (3), and the dynamic viscosity of the gas to be measured is obtained by calculation using formula (4).

What is claimed is:

1. A double-capillary viscometer for measuring viscosity of acid natural gas, comprising: an inlet shutoff valve (2) connected to a gas cylinder (1), a measuring line connected to the inlet shutoff valve (2), a solid particle filter (3) and a gas dryer (4), an upstream inlet piezoelectric valve (5) connected in sequence an upstream capillary (7), a intermediate piezoelectric valve (11), a downstream preheating capillary (13), a downstream measuring capillary (14), a downstream outlet piezoelectric valve (18), an outlet shutoff valve (19), a H$_2$S absorption bottle (20), and a vacuum pump (21) connected in a main measuring line; the main measuring line being divided into an upstream line and a downstream line; wherein the upstream capillary tube (7) is spirally wound on a cylindrical aluminum block and immersed in an alcohol thermostat (8), and the downstream preheating capillary (13) and the downstream measuring capillary (14) are immersed in an oil bath heating device (12) in a same manner; the upstream inlet pressure gauge (6) is connected behind the upstream inlet piezoelectric valve (5), and an upstream outlet pressure gauge (10) is arranged before the intermediate pressure piezoelectric valve (11), the upstream inlet pressure gauge (6) and the upstream outlet pressure gauge (10) being connected by an upstream differential pressure gauge (9); a downstream inlet pressure gauge (15) is arranged between the downstream preheating capillary (13) and the downstream measuring capillary (14), and a downstream outlet pressure gauge (17) is arranged before the downstream outlet piezoelectric valve (18), the downstream inlet pressure gauge (15) and the downstream outlet pressure gauge (17) being connected by an downstream differential pressure gauge (16).

2. The double-capillary viscometer for measuring viscosity of acid natural gas according to claim 1, wherein the upstream capillary (7), the downstream preheating capillary (13) and the downstream measuring capillary (14) are of a same dimension.

3. The double-capillary viscometer for measuring viscosity of acid natural gas according to claim 1, wherein the upstream capillary (7), the downstream preheating capillary (13) and the downstream measuring capillary (14) are respectively spirally wound on a cylindrical aluminum block with a radius of 0.1 mm.

4. The double-capillary viscometer for measuring viscosity of acid natural gas according to claim 1, wherein the upstream capillary (7), the downstream preheating capillary (13) and the downstream measuring capillary (14) are all made of Hastelloy, with a uniform nominal inner diameter of 0.500 mm.

5. A double-capillary viscometer for measuring viscosity of acid natural gas according to claim 1 wherein the gas cylinder (1) is capable of providing a sufficient and stable gas output.

6. The double-capillary viscometer for measuring viscosity of acid natural gas according to claim 1, wherein the alcohol thermostat (8) maintains a temperature of 298.15 K through alcohol bath heating method; the oil bath heating device (12) provides a temperature in a range of 298.15-513.15K through silicone oil bath heating method.

7. The double-capillary viscometer for measuring viscosity of acid natural gas according to claim 1, wherein the upstream differential pressure gauge (9), the downstream differential pressure gauge (16), three-way connections and the valves are all made of Hastelloy and have excellent corrosion resistance.

8. The double-capillary viscometer for measuring viscosity of acid natural gas according to claim 1, wherein the upstream inlet piezoelectric valve (5), the upstream outlet pressure gauge (10), the downstream inlet pressure gauge (15) and the downstream outlet pressure gauge (16) use Y-100BFZ stainless steel anti-vibration pressure gauge produced by Shanghai Automation Instrument Factory Four, with a scale range of 0 to 2.4 MPa and good vibration and corrosion resistances.

9. The double-capillary viscometer for measuring viscosity of acid natural gas according to claim 1, wherein the viscometer is measured by steps of:

step 1: flushing the line with standard helium gas for 30 minutes;

step 2: keeping the alcohol thermostat and the oil bath thermostat at 298.15K, introducing a helium gas when temperature is stable, obtaining $(P_1^{He}, P_2^{He})_{0,298.15}^{He}$ when flow is stable, keeping the temperature constant and pumping the line to vacuum, introducing a gas to be measured, controlling an inlet pressure by the upstream inlet piezoelectric valve to be constant, obtaining $(P_1^{mea}, P_2^{mea})_{0,298.15}^{mea}$ when flow is stable, and calculating a viscosity ratio of the helium gas to the measured gas at 298.15 K by a following formula, $$\frac{\eta_{0,298.15}^{mea}}{\eta_{0,298.15}^{He}} = \frac{(P_1^{mea} - P_2^{mea})_{0,298.15}^{mea}}{(P_1^{He} - P_2^{He})_{0,298.15}^{He}} \tag{1}$$

in the formula (1): He represents the helium gas;
Mea represents the gas to be measured;
η represents dynamic viscosity, mPa·s;
P represents pressure, MPa;

step 3: warming the oil bath thermostat to temperature T at which the measurement is to be performed, introducing the gas to be measured when temperature is stable, controlling an inlet pressure by the upstream inlet piezoelectric valve to be constant, adjusting the outlet piezoelectric valve, controlling a pressure difference between P3 and P4 to be an experimental pressure difference, obtaining $(P_1, P_2, P_3, P_4)_{0,T}^{mea}$ when flow is stable, pumping the line to vacuum, introducing the helium gas, repeating above operations, obtaining $(P_1, P_2, P_3, P_4)_{0,T}^{He}$ when flow is stable, calculating a viscosity rate $R_{T,298.15}^{mea,He}$ based on obtained data by a following formula;

$$R_{T,298.15}^{mea,He} = \frac{(P_1^2 - P_2^2)^{He}}{(P_1^2 - P_2^2)^{mea}} \frac{(P_3^2 - P_4^2)^{mea}}{(P_3^2 - P_4^2)^{He}} \tag{2}$$

step 4: calculating a theoretical value of the viscosity of helium gas at temperature T by formula (3):

$$\eta_{0,T}^{He} = -8.7272 \times 10^{-11} T^4 + 1.38504 \times 10^{-7} T^3 - 9.80906 \times 10^{-5} T^2 + 7.622 \times 10^{-2} T + 2.84835 \tag{3}$$

in the formula (3): T represents the temperature at which the measurement is to be performed, K;

step 5: calculating a dynamic viscosity of the measured gas at a simulated temperature and pressure by formula (4):

$$\eta_{0,T}^{mea} = \eta_{0,T}^{He} \left( \frac{\eta_{0,298.15}^{mea}}{\eta_{0,298.15}^{He}} \right) R_{T,298.15}^{mea,He}. \tag{4}$$

* * * * *